Nov. 3, 1942.      R. GRAY      2,301,036
BICYCLE
Filed Sept. 18, 1941
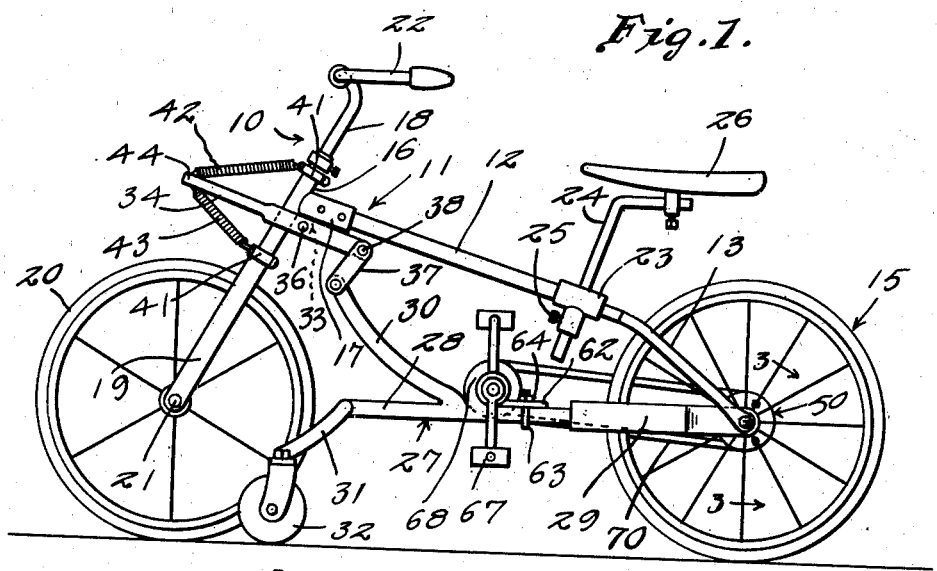
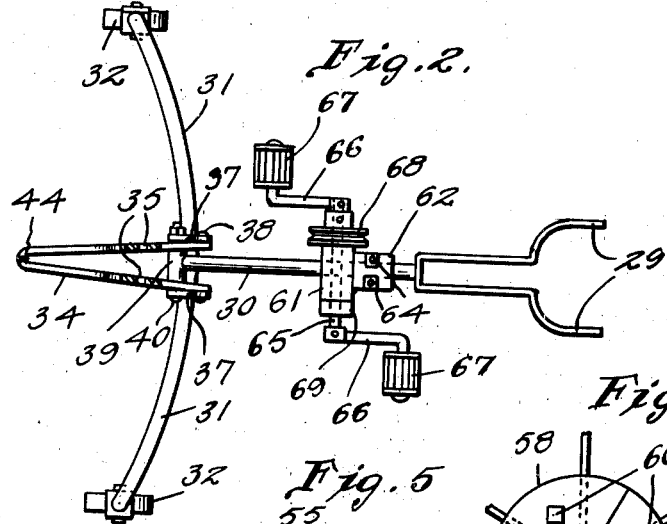
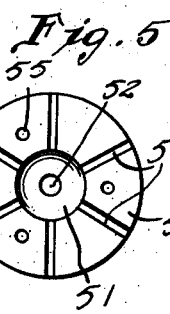
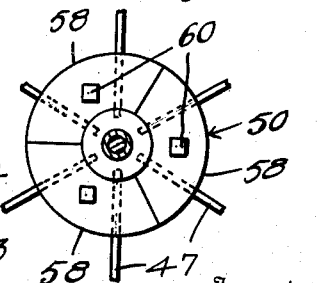
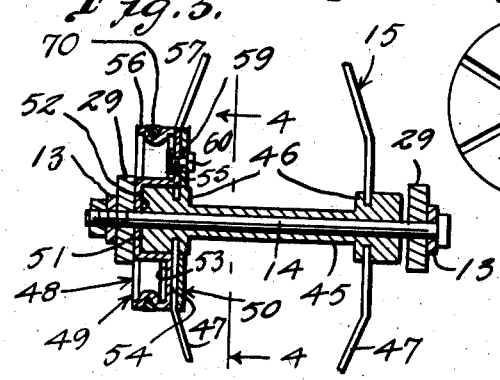
Inventor
Raymond Gray
By L. F. Laudreth
Attorney Patented Nov. 3, 1942

2,301,036

UNITED STATES PATENT OFFICE 2,301,036

BICYCLE

Raymond Gray, Sandy, Oreg.

Application September 18, 1941, Serial No. 411,385

3 Claims. (Cl. 280—293)

This invention relates to a novel construction of bicycle, and more particularly to a bicycle for small children having safety means for holding the bicycle in an upright position.

More particularly, it is an aim of the invention to provide an attachment in the form of a secondary frame for a bicycle and which is adapted to replace the lower portion of a conventional bicycle frame and which is provided with laterally projecting arms carrying casters adapted to engage the supporting surface of the bicycle for maintaining it in an upright position.

Still a further aim of the invention is to provide means for yieldably connecting the forward end of the secondary frame to the main frame of the bicycle and for pivotally connecting the rear end of the secondary frame to the bicycle so that said forward end can yield upwardly for yieldably holding the casters in engagement with the ground.

Other objects and advantages of the invention will hereinafter become more fully apparent from the following description of the drawing, which illustrates a preferred embodiment of the invention, and wherein:

Figure 1 is a side elevational view of the improved bicycle,

Figure 2 is a top plan view, partly in section, showing the secondary frame attached, Figure 3 is an enlarged cross sectional view through a portion of the rear wheel taken substantially along the plane of the line 3—3 of Figure 1, Figure 4 is a longitudinal sectional view of a portion of the rear wheel taken substantially along a plane indicated by the line 4—4 of Figure 3, and Figure 5 is a side elevational view looking toward the inner side of the rear pulley and showing said pulley removed from the rear wheel.

Referring more particularly to the drawing, wherein like reference characters designate like or corresponding parts throughout the different views, 10 designates generally the improved bicycle in its entirety and which includes a main frame, designated generally 11, provided with an upper bar 12 having a fork 13 at the rear end thereof which is adapted to be connected to the axle 14 of a rear wheel 15. A sleeve 16 is connected to the forward end of the bar 12 by means of a joint or coupling 17 and is disposed at an angle to the bar 12. A steering post 18 is turnably mounted in the sleeve 16 and is connected at its lower end to a front fork 19 in which is rotatably mounted a front wheel 20 on a front axle 21. The steering post 18 is provided with handlebars 22 at its upper end and it is to be understood that the front wheel 20 is adapted to be steered by means of the handlebars 22 in a conventional manner. The bar 12 forwardly of and adjacent the fork 13 is provided with a sleeve 23 in which a saddle post 24 is adjustably held by a set screw 25 and a conventional bicycle saddle 26 is mounted on the upper portion of the post 24 in a conventional manner.

From the foregoing description and from the illustration of Figure 1, it will be noted that the frame 11 differs from the conventional bicycle frame in that the saddle pillar thereof, the bar which extends from the lower end of the saddle pillar to the sleeve 16, and the lower rear fork are omitted.

A supplementary secondary frame, designated generally 27, is provided with a longitudinally extending main rod or bar 28 having a fork 29 which projects from and forms a continuation of the rear end thereof and which is pivotally connected to the rear axle 14, as best seen in Figure 3. The bar 28 is provided with an upwardly curved extension 30 near its forward end and is also provided with laterally projecting arms 31 at the forward end thereof and which are curved downwardly and forwardly, as seen in Figures 1 and 2. The forward end of the rod or bar 28 terminates behind and is spaced from the front wheel 20. A caster 32 is swivelly connected to the free end of each of the arms 31.

An ear or projection 33, as seen in dotted lines in Figure 1, is formed in the angle formed by the sleeve 16 and the union 17 and at the underside of said union. A V-shaped lever 34 is provided with openings 35, as seen in Figure 2, intermediate of the ends thereof for receiving and loosely engaging a bolt or pin 36 which extends through the ear 33 for pivotally mounting the lever 35 on the frame 11. The sleeve 16 extends through the legs of the V of the lever 34 and the intermediate portion of the lever extends forwardly from the frame 11 while the ends of the legs of the V thereof extend rearwardly of the frame. Corresponding links 37 are pivotally connected at complementary ends thereof by means of fastenings 38 to the free ends of the legs of the lever 34. The extension 30 is provided with a transverse sleeve 39 at its forward, free end through which extends a fastening 40 to which the opposite ends of the links 37 are pivotally connected. A clamp 41 is attached to the sleeve 16, adjacent each end thereof. A spring 42 is fastened at one end to the upper clamp 41 and a similar spring 43 is anchored at one end thereof to the lower clamp 41. The springs 42 and 43 converge outwardly, relatively to one another and are connected at their opposite ends to the forward end of the V-shaped lever 34 at 44. The springs 42 and 43 are of the contractile type and cooperate to yieldably hold the lever 34 in the position, as seen in Figure 1, and when thus positioned the casters 32 are adapted to be disposed to engage the surface engaged by the wheels 15 and 20.

The rear wheel 15 includes a hub 45, as seen in

Figure 3, having enlarged ends 46 in which the inner ends of the spokes 47 of the wheel 15 are anchored. A pulley, designated generally 48 is connected to one side of the wheel 15 and includes an outer section 49 and an inner ring section 50. The outer section 49 is provided with a cup shaped inner portion 51 to receive a portion of one of the enlargements 46 and has a central opening 52 through which the axle 14 loosely extends. The outer section 49 is also provided with an outwardly projecting annular flange portion 53 which projects radially from the cup 51 and which is provided on its inner side with radially extending grooves 54 and circumferentially spaced openings 55, as best seen in Figure 5. An annular rim portion 56 projects outwardly from the periphery of the flange 53 and is disposed substantially at a right angle thereto and is provided with a V-shaped groove 57, as seen in Figure 3. The inner ring 50 is formed of three corresponding arcuately shaped plates 58 each forming a third of a circle and each of which is provided with an opening 59 which is adapted to aline with an opening 55 for receiving a nut and bolt fastening 60 to secure the plates 58 to the flange 53. Each of the plates 58 engage two of the spokes 47 for retaining said spokes in engagement with the grooves 54 to key the pulley 48 to the wheel 15.

A bearing 61 is provided with a plate 62 through which extend the ends of a U-shaped bolt 63 and said ends are threaded to engage nuts 64 for clamping the plate 62 to the bar or rod 28, around which the U-shaped bolt 63 is disposed to position the bearing 61 above and crosswise of the bar 28. A shaft 65 extends through and is journaled in the bearing 61. Cranks 66 are keyed to the ends of the shaft 65 and extend therefrom in opposite directions relatively to one another and are provided with pedals 67 at their outer ends and which are of conventional construction and conventionally mounted. A pulley 68 is keyed to the shaft 65 between the bearing 61 and one of the crank arms 66 and a collar 69 is keyed to the shaft 65 near its opposite end. Pulley 68 engages one end of the bearing 61 and the collar 69 the other end thereof to prevent the shaft 65 from sliding relatively to the bearing. The pulley 68 is of V-type and a V-shaped belt 70 is trained over the pulley 68 and the pulley 48 for driving the rear wheel when the crank arms 66 and shaft 65 are revolved. It will be readily apparent that the nuts 64 can be loosened for longitudinally adjusting the bearing 61 relatively to the bar 28 for tensioning the belt 70.

If desired, sprocket wheels could be substituted for the pulleys 48 and 68 and a chain could be used in lieu of the belt 70.

From the foregoing it will be obvious that the caster wheels 32 will act to hold the bicycle 10 in an upright position so that a young child, not capable of balancing himself on a conventional two wheel bicycle can ride the bicycle 10. The arms 31 are spaced sufficiently from the front wheel 19 so as not to interfere with the turning thereof and are also sufficiently forward relatively to the bicycle 10 to permit a rider to get on and off of the bicycle without striking the arms 31 or casters 32. The springs 42 and 43 are held under just sufficient tension to retain the casters 32 in engagement with the surface on which the wheels 15 and 20 are resting and said springs allow the front wheel 20 to yield upwardly relatively to the casters 32 or permit the casters 32 to yield upwardly relatively to the front wheel so that either the wheel or casters can ride over obstructions, each without affecting the other.

In view of the detailed description of the construction of the invention a further description of the operation thereof is deemed unnecessary as the operation and advantages of the invention are considered clearly apparent from the drawing and detailed description.

Various modifications and changes are contemplated and may obviously be resorted to provided they fall within the scope of the appended claims.

I claim as my invention:

1. A bicycle having a main frame including an upper bar having a fork at its rear end in which the rear wheel of the bicycle is adapted to be mounted, said bar having a front fork swivelly connected to its forward end and in which the front wheel of the bicycle is adapted to be mounted, a secondary frame including a longitudinally extending bar having a fork at the rear end thereof adapted to be attached to the rear wheel, said last mentioned bar having lateral extensions at its forward end, casters connected to the ends of said extensions, and means for yieldably connecting the forward end of the secondary frame to the main frame, said yieldable connecting means including a lever pivotally connected intermediate of its ends to said main frame, link means pivotally connected to one end of said lever and to the forward end of the secondary frame, and spring means for engaging and yieldably positioning the opposite end of said lever for yieldably positioning the forward end of the secondary frame relatively to the main frame.

2. A bicycle having a main frame including an upper bar having a fork at its rear end in which the rear wheel of the bicycle is adapted to be mounted, said bar having a front fork swivelly connected to its forward end and in which the front wheel of the bicycle is adapted to be mounted, a secondary frame including a longitudinally extending bar having a fork at the rear end thereof adapted to be attached to the rear wheel, said last mentioned bar having lateral extensions at its forward end, casters connected to the ends of said extensions, and means for yieldably connecting the forward end of the secondary frame to the main frame, said bicycle having a foot propelling mechanism adapted to be mounted on said secondary frame, clamping means for adjustably and detachably securing said mechanism thereto.

3. In combination with a bicycle, a secondary frame adapted to be pivotally connected at its rear end to the rear wheel axle of the bicycle, said secondary frame extending forwardly therefrom, means for yieldably connecting the forward end of the secondary frame to the bicycle frame, arms projecting laterally from said secondary frame, and casters connected to the free ends of said arms and adapted to engage the surface over which the bicycle is moving, said means for yieldably connecting the forward end of the frame to the bicycle frame including a bar extending upwardly from said secondary frame and adjacent the forward end thereof, a lever pivotally mounted intermediate of its ends on the bicycle frame, a link pivotally connected to one end of said lever and to the free end of said bar, and springs connected to the opposite end of said lever and to the bicycle frame for yieldably holding the lever in a fixed position relatively to the frame of the bicycle.

RAYMOND GRAY.